US011177952B2

United States Patent
Fries et al.

(10) Patent No.: US 11,177,952 B2
(45) Date of Patent: Nov. 16, 2021

(54) METHOD AND SYSTEM FOR DISCLOSING AT LEAST ONE CRYPTOGRAPHIC KEY

(71) Applicant: Siemens Aktiengesellschaft, Munich (DE)

(72) Inventors: Steffen Fries, Baldham (DE); Rainer Falk, Poing (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/964,425

(22) PCT Filed: Jan. 16, 2019

(86) PCT No.: PCT/EP2019/051078
§ 371 (c)(1),
(2) Date: Jul. 23, 2020

(87) PCT Pub. No.: WO2019/145207
PCT Pub. Date: Aug. 1, 2019

(65) Prior Publication Data
US 2021/0050996 A1 Feb. 18, 2021

(30) Foreign Application Priority Data

Jan. 26, 2018 (EP) .................................... 18153594
Jan. 30, 2018 (EP) .................................... 18154078

(51) Int. Cl.
*H04L 9/08* (2006.01)
*H04L 9/30* (2006.01)
(52) U.S. Cl.
CPC ............... *H04L 9/088* (2013.01); *H04L 9/30* (2013.01)

(58) Field of Classification Search
CPC ......... H04L 9/088; H04L 9/30; H04L 63/061; H04W 12/0433; H04W 12/0471
See application file for complete search history.

(56) References Cited

U.S. PATENT DOCUMENTS 9,049,011 B1 * 6/2015 Agrawal ............... H04L 9/0825
9,705,769 B1 * 7/2017 Sarangapani ....... G06F 11/3414
(Continued)

FOREIGN PATENT DOCUMENTS

DE 102010011656 A1 9/2011

OTHER PUBLICATIONS

Dieber Bernhard et al.: "Application-level security for ROS-based pplications", 2016 IEEE/RSJ International Conference On Intelligent Robots and Systems (IROS), IEEE, pp. 4477-4482, XP033012009, DOI: 10.1109/IROS.2016.7759659, Summary, figure 2, section II-A, section II-B, section II-C, section II-D; 2016; 6 pages.

(Continued)

*Primary Examiner* — Techane Gergiso
(74) *Attorney, Agent, or Firm* — Schmeiser, Olsen & Watts LLP

(57) ABSTRACT

A method for the disclosure of at least one cryptographic key used for encrypting at least one communication connection between a first communication subscriber and a second communication subscriber in which, in a publish-subscriber server, at least one of the communication subscribers logs on as a publishing unit and at least one monitoring device logs on as a subscribing unit, and in a subsequent negotiation of a cryptographic key by the publishing unit, automatically the negotiated cryptographic key is supplied from the publishing unit to the publish-subscribe server, the negotiated cryptographic key is transmitted from the publish-subscribe server to the at least one subscribing unit, and the encrypted communication connection from the subscribing unit is (Continued)

decrypted using the cryptographic key is provided. The following also relates to a corresponding system.

18 Claims, 3 Drawing Sheets

(56) References Cited

U.S. PATENT DOCUMENTS

| | | | | |
|---|---|---|---|---|
| 9,762,554 | B2* | 9/2017 | Zombik | H04L 41/28 |
| 2005/0097317 | A1* | 5/2005 | Trostle | H04L 63/0807 |
| | | | | 713/163 |
| 2005/0204139 | A1* | 9/2005 | Helland | H04L 9/0825 |
| | | | | 713/171 |
| 2013/0013922 | A1* | 1/2013 | Kerschbaum | H04L 63/062 |
| | | | | 713/168 |
| 2014/0122874 | A1* | 5/2014 | Janakiraman | H04W 12/037 |
| | | | | 713/160 |
| 2016/0080334 | A1* | 3/2016 | Hamilton | H04L 63/0428 |
| | | | | 713/168 |
| 2016/0301695 | A1* | 10/2016 | Trivelpiece | H04L 63/0876 |
| 2017/0149743 | A1* | 5/2017 | Fukuda | H04L 63/0428 |
| 2018/0198766 | A1* | 7/2018 | Moon | H04L 9/0825 |
| 2020/0213839 | A1* | 7/2020 | Truchan | H04W 12/033 |

OTHER PUBLICATIONS

Peng Wei et al.: "A secure publish/subscribe protocol for Internet of Things using identity-based cryptography", 2016 5th International Conference On Computer Science and Network Technology (ICCSNT), IEEE, pp. 628-634, XP033227673, DOI: 10.1109/ICCSNT.2016. 8070234, summary; fig. 1, 2, 3, 4; section III; 2016; 7 pages.

International Search Report and Written Opinion of International Searching Authority for corresponding PCT Patent Application No. PCT/EP2019/051078 dated Apr. 15, 2019; 15 pages.

Extended European Search Report in corresponding European Patent Application No. 18153594.9 dated May 25, 2018. 8 pages.

* cited by examiner

METHOD AND SYSTEM FOR DISCLOSING AT LEAST ONE CRYPTOGRAPHIC KEY

CROSS-REFERENCE TO RELATED APPLICATIONS

This application is a national stage entry of PCT Application No. PCT/EP2019/051078, having a filing date of Jan. 16, 2019, which claims priority to European Patent Application No. 18154078.2, having a filing date of Jan. 30, 2018, and European Patent Application No. 18153594.9, having a filing date of Jan. 26, 2018, the entire contents of which are hereby incorporated by reference.

FIELD OF TECHNOLOGY

The following relates to a system, a computer program product and a method for disclosing at least one cryptographic key which is used to protect a communication connection between a first communication subscriber and a second communication subscriber.

BACKGROUND

In industrial installations and automation systems, sensitive control and monitoring data are often transmitted via a data network. In order to protect the data during transmission, a security protocol, for example IPsec/IKEv2 or MACsec and, in particular, the transport layer security protocol TLS, is used, for example. In this case, the authenticity of the communication subscribers is checked and, depending on the configuration of the protocol, manipulation and tapping of the communication connection are prevented. For this purpose, cryptographic keys, for example session keys, which are used to encrypt the transmitted data are usually negotiated when setting up the connection.

On the other hand, however, there is also the requirement to monitor the industrial installation in order to be able to diagnose a malfunction or incorrect administration, for example. In some applications, there is also the requirement to record control communication in a "blackbox recorder" in order to be able to clarify the cause of the damage in the event of an accident. There may also be the requirement to document the sequence of a production operation. Therefore, there is also a need to monitor cryptographically protected and, in particular, encrypted communication connections, in particular in industrial automation and control systems.

In order to meet these requirements, control data could be transmitted in an unprotected manner for such applications. Although communication can then be monitored, it is no longer protected from tapping by third parties or from manipulation.

It is also known practice to use so-called integrity-only cipher suites, for example in conjunction with a transport layer security protocol (TLS) Version 1.2. These integrity-only cipher suites protect only the integrity of the transmitted data and ensure the authenticity of the communication partners. However, the confidentiality of the data is not protected since the useful data are transmitted as plain text, that is to say without encryption. As a result, the cryptographically protected communication can be monitored here. However, communication is entirely unencrypted, with the result that it can be tapped by any desired third parties.

As a result, such a solution is not suitable when transmitting sensitive process data or when transmitting via public networks.

A multi-context TLS protocol is also known. In this case, the presence of intermediate components is signaled to the communication partner when setting up a connection, during which authentication and key negotiation take place. The intermediate components which are therefore known to both communication partners are included in the negotiation of the session key material. Some of the session key material is made available to them. As a result, the intermediate components indicated when setting up the connection decrypt the encrypted data traffic, but changes would be detected by the communication partners. This has the advantage that the intermediate components which can listen in on the communication traffic are explicitly known to the communication partners involved. However, this also has the disadvantage that the intermediate components must be actively involved in the negotiation and this therefore results in a temporally delayed connection set-up. On the other hand, these intermediate components may in turn be manipulated by unauthorized third parties and the transmitted data may therefore be made accessible in plain text.

DIEBER Bernhard et al., Application Level Security for ROS-based Applications", Oct. 9, 2016, XP033012009, discloses a method in which communication between a robot-operated system (ROS) or an application on the ROS and a user of the application is protected using a security mechanism on the application layer. A publish/subscribe server which is operated as an authentication server is used for this purpose.

PENG WEI ET AL: "A secure publish/subscribe protocol for Internet of Things using identity-based cryptography", 12 Oct. 2016, XP033227673, describes identity-based cryptography in order to authenticate the identity and set up trust zones with improved security. A publish/subscribe server which is in the form of an IoT gateway is used for this purpose in order to provide encrypted communication between the publishing unit and the subscribing unit.

SUMMARY

An aspect relates to providing a monitoring apparatus with a cryptographic key, which is used to encrypt a communication connection, in a flexible manner and with a short time delay.

According to a first aspect, the embodiment of the present invention relates to a method for disclosing at least one cryptographic key which is used to encrypt at least one communication connection between a first communication subscriber and a second communication subscriber, wherein at least one of the communication subscribers is registered as a publishing unit with a publish/subscribe server and at least one monitoring device is registered as a subscribing unit. When subsequently negotiating a cryptographic key by means of the publishing unit, the negotiated cryptographic key is automatically made available to the publish/subscribe server by the publishing unit, the negotiated cryptographic key is transmitted from the publish/subscribe server to the at least one subscribing unit, and the encrypted communication connection is decrypted by the subscribing unit using the cryptographic key.

A cryptographic key of a communication connection can be easily transmitted to a monitoring unit and disclosed to the latter by means of the described method. It suffices to register a monitoring unit as a subscribing unit with the publish/subscribe server once in order to decrypt all subsequent encrypted communication connections of the communication subscribers registered as publishing units with the publish/subscribe server and therefore be able to convert them into plain text. A further advantage is that it is possible to incorporate a multiplicity of communication subscribers and likewise monitoring devices for monitoring. There is no need for any explicit additional integration of the monitoring device into the key negotiation for a communication connection, thus resulting in no delay or only a slight delay in the time needed to set up the communication connection. Different monitoring devices can also be flexibly added or removed from the monitoring. The registration of a communication subscriber as a publishing unit also comprises registration of communication subscribers as a publishing unit with the publish/subscribe server by third parties, for example when configuring the publish/subscribe server.

The cryptographic key is therefore disclosed using a publish/subscribe message schema in which a publishing unit does not address a message, here the cryptographic key, directly to the actual recipient, that is to say the subscribing unit, but instead sends its messages to be published on a predefined topic to an interposed mediator unit, also called message broker or publish/subscribe server here, without knowing the subscribing unit. Accordingly, the subscribing unit communicates its interest in messages on the topic to the publish/subscribe server without knowing the exact sender, that is to say the publishing unit. In the method described here, the predefined topic is the disclosure of the cryptographic key. The messages to be published which contain the cryptographic key in the present method are therefore received from the communication subscriber as the publishing unit in the publish/subscribe server on the topic of "disclosure of the cryptographic key" and are forwarded to the monitoring units registered for this topic as subscribing units.

In one advantageous embodiment, the negotiated cryptographic key is provided by the publishing unit only for a communication connection which satisfies at least one predefined criterion.

These predefined criteria make it possible to flexibly adapt monitoring to different requirements. Monitoring can therefore be reduced to particular communication connections, with the result that disclosure situations can be reduced to a minimum.

In one advantageous embodiment, a protocol used for the communication connection, an address, for example an IP address, of the communication partner, a domain name system name used for the communication connection, a port number used or a combination of the criteria is used as the criterion.

Disclosure of the cryptographic keys can therefore be restricted to particular applications, particular communication partners or communication providers.

In one advantageous embodiment, the negotiated cryptographic key is provided only for a communication connection starting from the publishing unit or arriving at the publishing unit.

Incoming or outgoing communication connections of the communication subscriber can therefore be specifically monitored.

In one advantageous embodiment, an integrity key which is used to check the integrity of the communication connection is additionally made available to the publish/subscribe server.

This has the advantage that it is also possible to check the integrity of a communication connection, in particular.

In one advantageous embodiment, the negotiated cryptographic key is immediately transmitted to the subscribing unit after setting up the communication connection or only after expiry of a predefined period.

For example, a communication connection can be monitored only with a time delay or only after termination of the current communication connection. Communication connections containing highly sensitive data can therefore be decrypted and monitored only with a time delay. On the other hand, it is possible to flexibly handle time-critical transmitted data.

In one advantageous embodiment, a commitment value of the at least one cryptographic key is provided or transmitted.

A commitment value may be a hash value of the cryptographic key, for example.

This has the advantage that it is possible to check whether both communication subscribers have actually received the same key. However, the key component transmitted during a Diffie-Hellman key exchange can also be used as the commitment value.

In one advantageous embodiment, the cryptographic key is provided or transmitted in a manner encrypted with a transport key, in particular a public key of the subscribing unit or a group key, which differs from the cryptographic key.

The use of a transport key has the advantage that the authorization to access the current cryptographic key is separate from the distribution via the publish/subscribe server. The authorization to access the current cryptographic key can thus be made dependent, for example, on the availability of the corresponding public key or the group key in the communication subscriber. Despite a subscription of a monitoring device to the publish/subscribe server, the monitoring device can therefore use a cryptographic key only when a communication subscriber has encrypted the cryptographic key using the corresponding public key of the monitoring device. In the case of a group key as a transport key, a monitoring device can monitor only communication connections of communication subscribers using the same group key as the monitoring device.

In one advantageous embodiment, the transport key is transmitted to the communication subscriber as a publishing unit via a publish/subscribe server after the communication subscriber has been registered as a second subscribing unit and at least one monitoring device has been registered as a second publishing unit with the publish/subscribe server for distributing the transport keys.

This has the advantage that different distribution mechanisms are not needed to distribute the publication key and the transport key. The distribution of the transport keys can therefore be made flexible in a similar manner to the distribution of the publication keys.

In one advantageous embodiment, a publish/subscribe protocol, in particular a session initiation protocol SIP, a unified architecture protocol of the OPC foundation OPC-UA, an extensible messaging and presence protocol XMPP, an advanced message queuing protocol AMQP or a message queuing telemetry transport protocol MQTT, is used to disclose the cryptographic key.

This has the advantage that these widespread protocols, which also support the publish and subscribe process, are available for carrying out the method.

A further aspect of the present invention relates to a system for disclosing at least one cryptographic key which is used to encrypt at least one communication connection between a first communication subscriber and a second communication subscriber, comprising at least one first communication subscriber, at least one second communication subscriber, at least one monitoring device and a publish/subscribe server, wherein the at least one monitoring device is designed to be registered as a subscribing unit with the publish/subscribe server, to receive the negotiated cryptographic key from the publish/subscribe server and to decrypt the encrypted communication connection using the cryptographic key, at least one of the communication subscribers is designed to be registered as a publishing unit with the publish/subscribe server, and to make the negotiated cryptographic key available to a publish/subscribe server during each subsequent negotiation of a cryptographic key, the publish/subscribe server is designed to transmit negotiated cryptographic keys to a monitoring device.

In one advantageous embodiment, the system is designed to carry out the method according to the described method.

In one advantageous embodiment, the at least one subscribing unit, the at least one publishing unit and the publish/subscribe server are designed to carry out topic-based publish/subscribe methods.

This has the advantage that one or more publish/subscribe servers can carry out a plurality of publish/subscribe methods. That is to say, a subscribing unit can subscribe for a plurality of topics and can accordingly receive information from the communication subscribers registered as publishing units for these topics. On the other hand, a communication subscriber may be registered as a subscribing or publishing unit for different topics. This makes it possible, for example, to distribute the cryptographic key and the transport key in opposite transmission directions between the communication subscriber and the monitoring unit.

In one advantageous embodiment, the monitoring device is arranged inside a communication connection.

In one advantageous embodiment, a connection device is arranged inside the communication connection and the monitoring device is in the form of a component physically separate from the connection device and is connected to the connection device.

This has the advantage that a plurality of connection devices can be connected to one or a few monitoring devices and the monitoring of communication connections routed via a wide variety of connection devices can therefore be centrally monitored.

A further aspect of the present invention relates to a computer program product (non-transitory computer readable storage medium having instructions, which when executed by a processor, perform actions) which can be directly loaded into a memory of a digital computer, comprising program code parts which are suitable for carrying out the steps of the described method.

BRIEF DESCRIPTION

Some of the embodiments will be described in detail, with reference to the following figures, wherein like designations denote like members, wherein.

DETAILED DESCRIPTION

The devices described below, for example the communication subscriber, monitoring device or publish/subscribe server, can be implemented using hardware or software or in combination as a hardware/software codesign. In the case of a hardware implementation, the respective unit may be in the form of an apparatus or part of an apparatus, for example a computer or a microprocessor or a control computer. In the case of a software implementation, the respective unit may be in the form of a computer program product, a function, a routine, part of a program code or an executable object. In the case of a hardware/software codesign implementation, the respective unit may be partially in the form of an apparatus or part of an apparatus, for example a computer or a microprocessor or a control computer, and partially in the form of a computer program product, a function, a routine, part of a program code or an executable object.

Figure 1:
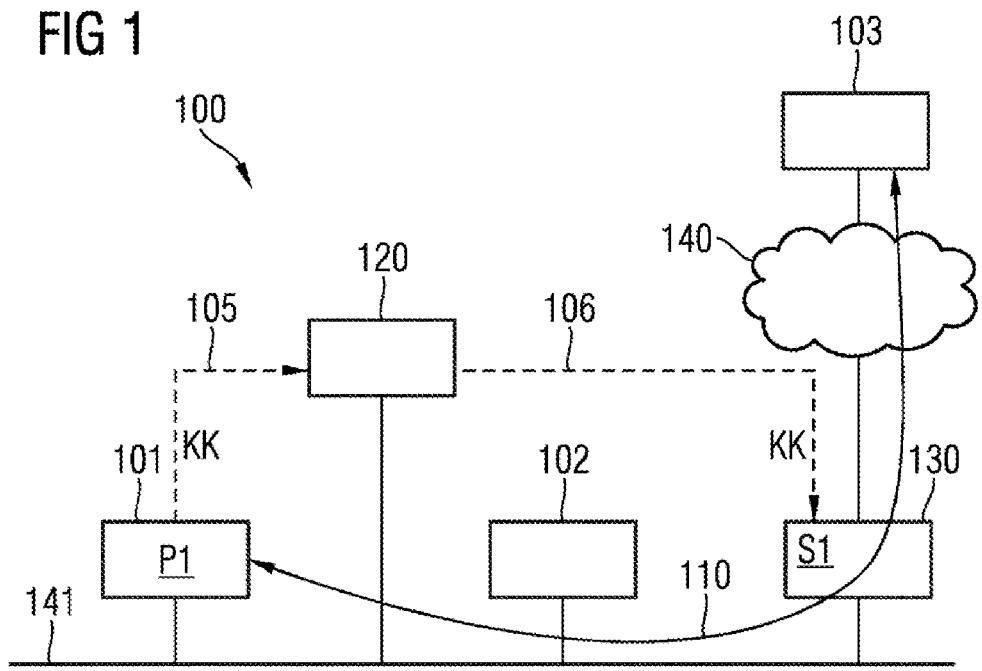
FIG. 1 depicts a block diagram of a first exemplary embodiment of the system.

The system 100 illustrated in FIG. 1 represents, for example, an industrial installation, for example a traffic safety network or an automation system, in which communication subscribers 101, 102, 103 interchange data via an internal private communication network 141 or via a public communication network 140. Security protocols, for example the transport layer security protocol TLS or the datagram transport layer security protocol DTLS, or security protocols such as IPsec/IKEv2 or MACsec are used, in particular, to transmit the data. The communication subscribers 101 and 102 may be in the form of field devices of an automation system, for example. The communication subscriber 103 may be, for example, an outsourced apparatus which provides the system 100 with a service. In order to interchange data, a communication connection 110 is set up, by way of example, between a first communication subscriber 101 and a second communication subscriber 103 by means of a security protocol. Are transmitted in an encrypted form via the communication connection 110 in order to prevent manipulation and tapping of the communication. A monitoring unit 130 of the system 100 is designed to decrypt the encrypted communication connection 110 and to provide it for storage or further evaluation.

When setting up a communication connection, a security protocol usually determines a cryptographic key KK, for example a session key, which is used to encrypt the data to be transmitted. This cryptographic key KK must therefore be known to the monitoring device 130 in order to be able to decrypt and evaluate the encrypted data.

According to the embodiment of the present invention, the at least one cryptographic key KK is disclosed by means of a publish/subscribe method, in particular a topic-based publish/subscribe method. For this purpose, at least one of the communication subscribers 101 and 103 of the communication connection 110, here only the communication subscriber 101, is designed to be registered as a publishing unit P1 with a publish/subscribe server 120. The communication subscribers can also be registered with the publish/subscribe server 120 by a third party or can be preconfigured in the publish/subscribe server 120. The communication apparatus 101 in the form of a publishing unit P1 is designed to forward the at least one cryptographic key the cryptographic keys to the publish/subscribe server 120 in stipulated key publication events.

One or more monitoring units, the monitoring unit 130 in FIG. 1, are designed to be registered as subscribing units, here the subscribing unit S1, with the publish/subscribe server 120. In this case, the publish/subscribe server 120 is designed to transmit data between the publishing unit P1 and the subscribing unit S1.

The monitoring device and the at least one communication subscriber are registered with the publish/subscribe server 120 for a topic. This topic stipulates which information or messages, here the cryptographic key KK for example, is/are intended to be transmitted. In the present case, the publish/subscribe topic is, for example, "disclosure of the cryptographic key KK". In the example illustrated, the cryptographic key KK is therefore transmitted from the publishing unit P1 to the publish/subscribe server 120, see arrow 105. In the publish/subscribe server 120, the cryptographic key KK is transmitted to the subscribing unit S1, that is to say the monitoring device 130, depending on predefined criteria for the communication connection and guidelines, for example temporally delayed forwarding, see arrow 106. Such criteria are, for example, a connection protocol used to set up the communication connection or an address, here an IP address or a MAC address for example, or a port number of the communication subscriber 103 or the addressed DNS server name or the authorization of one of the subscribers to participate in corresponding communication.

The communication subscriber 101 registered as a publishing unit P1 automatically transmits, after being registered as a publishing unit P1 once, the negotiated cryptographic key KK to the publish/subscribe server 120 during each subsequent connection set-up.

The monitoring device 130 may be formed in a firewall, for example, via which a communication connection 110 is routed to a communication subscriber 103 connected via a public network 140.

Furthermore, only the encryption key which is used to encrypt the data to be transmitted on the communication connection 110 or additionally an integrity key which is used to check the integrity of the communication connection can be made available to the publish/subscribe server 120 as a cryptographic key KK. The negotiated cryptographic key KK can also be provided only for a communication connection 110 starting from the publishing unit P1 or only for an incoming communication connection 110 or for an outgoing and incoming communication connection 110.

It is also possible to transmit a commitment value of a key instead of the actual cryptographic key KK. This commitment value may be, for example, the hash value of the cryptographic key KK. The actual cryptographic key is transmitted to the subscribing unit S1 only at a later time. The commitment key can be used to check whether the correct cryptographic key KK has been subsequently provided. A third party can therefore check whether both the publish/subscribe server and the subscribing unit have actually received the same key. This third party may be, for example, a checking device which is used for auditing or loggin.

Figure 2:
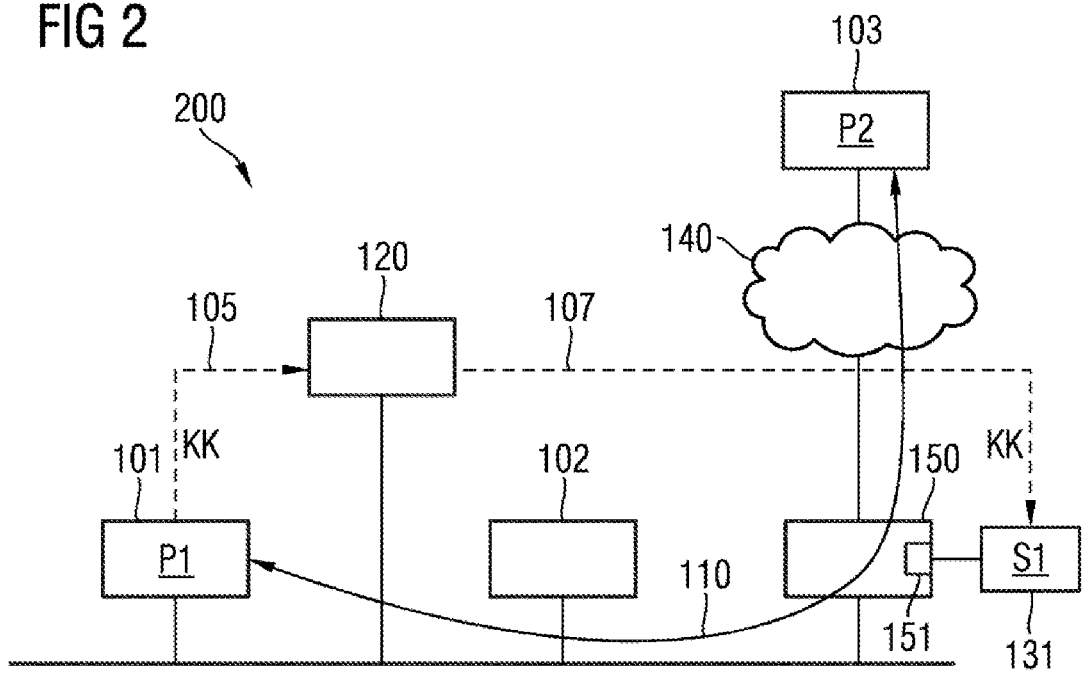
FIG. 2 depicts a block diagram of a second exemplary embodiment of the system having a monitoring device outside the communication connection.

FIG. 2 shows a system 200 in which a monitoring device 131 is not directly arranged inside the communication connection 110. In the system 200, the monitoring device 131, which is registered as a subscribing unit S1 as the recipient of the cryptographic key with the publish/subscribe server 120, is connected to a connection device 150. The connection device 150 is arranged inside the communication connection 110 and forwards the encrypted data from the communication connection 110. In this case, the monitoring unit 150 comprises, for example, a mirror output 151 which copies the encrypted data transmitted on the communication connection 110 and forwards them to the monitoring unit 131. In this case, the cryptographic key KK is transmitted from the publish/subscribe server 120 to the monitoring unit 131 as a subscribing unit S1, see arrow 107. This can be carried out via a separate connection between the publish/subscribe server 120 and the monitoring device 131. However, the cryptographic key may also be transmitted from the publish/subscribe server 120 to the monitoring device 131 via the connection device 150. In this case, the cryptographic key KK can be forwarded to the monitoring device 131 via the mirror output 151.

In the system 200, the second communication subscriber 103 is additionally registered as a publishing unit P2 with the publish/subscribe server 120. In this case, the second communication subscriber 103 likewise publishes the cryptographic key negotiated for the communication connection 110 or those parts of the cryptographic key KK which are known to it. If both the first communication subscriber 101 and the second communication subscriber 103 are registered as publishing units P1, P2, only components of the cryptographic key KK can also be transmitted to the subscribing unit S1. The subscribing unit S1 can itself determine the cryptographic key KK used in the communication connection 110 from the transmitted components. For example, the transmitted components of the cryptographic key KK may be the encryption components interchanged in a Diffie-Hellman encryption method.

Figure 3:
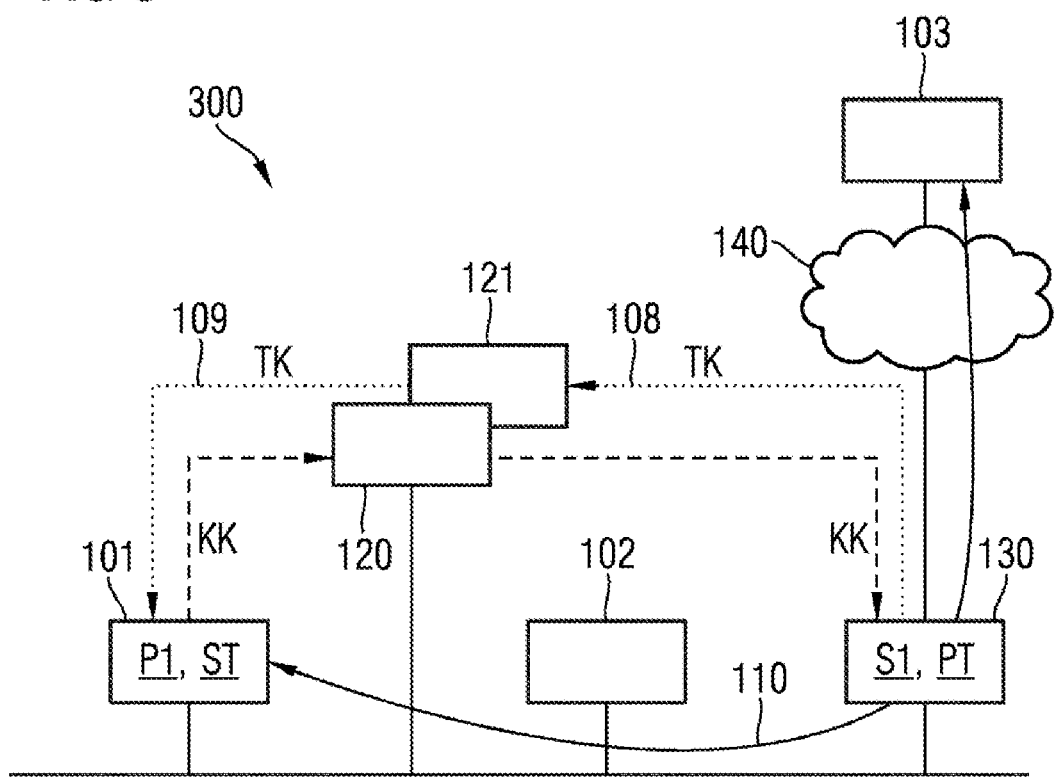
FIG. 3 depicts a block diagram of a third exemplary embodiment of the system with disclosure of a transport key.

FIG. 3 shows a system 300 in which corresponding to the system 100 from FIG. 1. The first communication subscriber 101 is registered as a publishing unit P1 with the publish/subscribe server 120 in this case. The monitoring unit 130 is arranged inside a communication connection 110 to be monitored and is registered as a subscribing unit S1 with the publish/subscribe server 120.

In addition to the publish/subscribe server 120, a second publish/subscribe server 121 is arranged in the system 300 and is configured to disclose a transport key. The publish/subscribe server 121 is designed according to the publish/subscribe server 120 already described but implements a publish/subscribe method on a second topic, namely the interchange of a transport key between the first communication subscriber 101 and the monitoring unit 130. In this case, the monitoring device 130 is additionally registered as a second publishing unit PT for the second topic and the first communication subscriber 101 is registered as a second subscribing unit ST for the second topic in the publish/subscribe server 121. The monitoring device 130 publishes the transport key TK by transmitting it to the publish/subscribe server 121, see arrow 108. In the case of an event accordingly set up in the publish/subscribe server 121, the latter transmits the transport key TK to the first communication subscriber 101, see arrow 109. Such an event is, for example, the registration of the first communication subscriber 101 with the publish/subscribe server 120 for the topic of "publication of a cryptographic key KK".

In one advantageous embodiment, the publish/subscribe server 121 and the publish/subscribe server 120 are integrated in the same hardware. The communication subscriber 101 as a second subscribing unit ST therefore automatically receives the transport key TK from the monitoring unit 130 as a publishing unit PT. If the monitoring device 130 changes the transport key TK, the latter is again transmitted from the monitoring device 130 as a second publishing unit PT to the publish/subscribe server 121.

Figure 4:
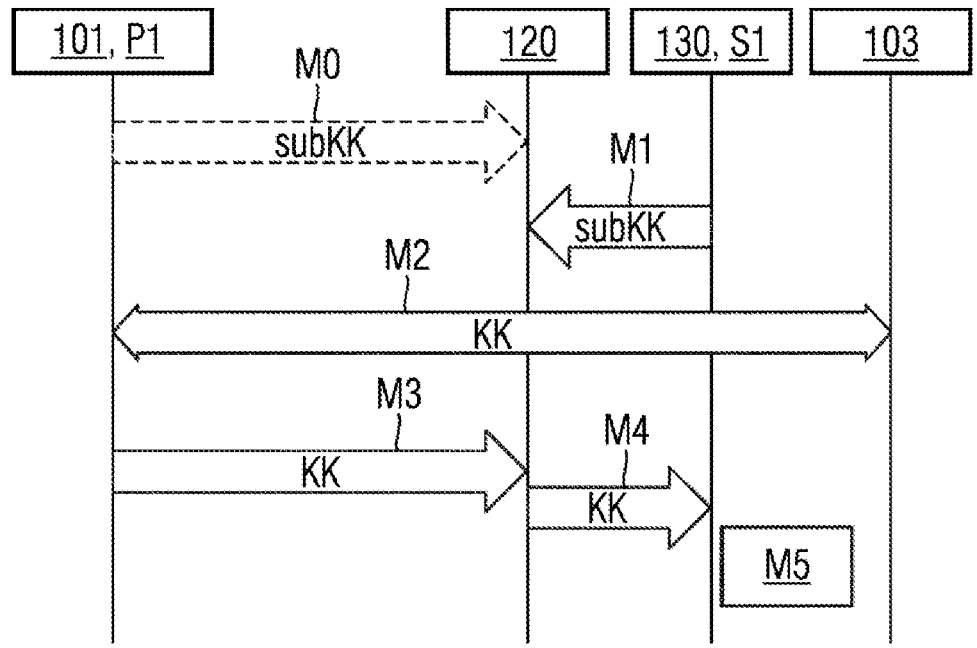
FIG. 4 depicts a first exemplary embodiment of the method in the form of a message flowchart.

FIG. 4 now shows the described method on the basis of a message flow of a publish/subscribe protocol which controls the transmission of the necessary information. A session initiation protocol SIP, a unified architecture protocol of the OPC foundation, also known as OPC UA for short, an extensible messaging and presence protocol XMPP or an advanced message queuing protocol AMQP or MQTT, for example, can be used as the publish/subscribe protocol for carrying out the method steps.

In the publish/subscribe server 120, the first communication subscriber 101 is registered as a publishing unit P1 for the publish/subscribe topic of "cryptographic key" subKK in a first method step M0. This can be actively carried out by interchanging messages M0, as illustrated as a dashed arrow in FIG. 4. However, the first communication subscriber 101 may also be registered as a publishing unit P1 in the publish/subscribe server 120 by means of configuration. If a communication subscriber is actively registered with the publish/subscribe server 120, publishing units can be advantageously dynamically added or deregistered without additionally configuring the publish/subscribe server 120.

In step M1, the monitoring device 130 is registered as a subscribing unit S1 for the publish/subscribe topic of "cryptographic key" subKK with the publish/subscribe server 120. In step M2, in the course of setting up a communication connection, for example via the TLS protocol, authentication and a key agreement between the first communication subscriber 101 and a second communication subscriber 103 are then carried out. The cryptographic key KK agreed in the process may be a session key, for example, and is known to the two communication subscribers 101, 103. In step M3, the first communication subscriber 101 registered as a publishing unit P1 in the publish/subscribe server 120 transmits the negotiated cryptographic key KK to the publish/subscribe server 120, for example with an indication of a connection or session identifier and an identifier of the first and second communication subscribers. In the case of an event agreed for the publish/subscribe topic of "cryptographic key", the publish/subscribe server forwards the cryptographic key KK and, for example, the session identifier and the identifiers of the first and second communication subscribers 101, 103 to the monitoring device 130 as a subscribing unit S1, see step M4. In the monitoring unit 130, the data traffic of the communication connection between the first and second communication subscribers 101 and 103 is now decoded and analyzed in step M5. In this case, the decoded data traffic can be evaluated directly after decoding or at a later time.

In order to enable protected transmission of the cryptographic key KK from the communication subscriber 101 to the publish/subscribe server 120 and from there on to the monitoring device 130, a transport key TK can already be transmitted from the publish/subscribe server 120 to the first communication subscriber 101 during registration for the publish/subscribe topic of "cryptographic key" in method step M0. This is not explicitly illustrated in FIG. 4 in order to preserve clarity. The transport key TK may be preconfigured, for example, in the publish/subscribe server 120 for the publish/subscribe topic of "cryptographic key" and in the monitoring unit 130.

Figure 5:
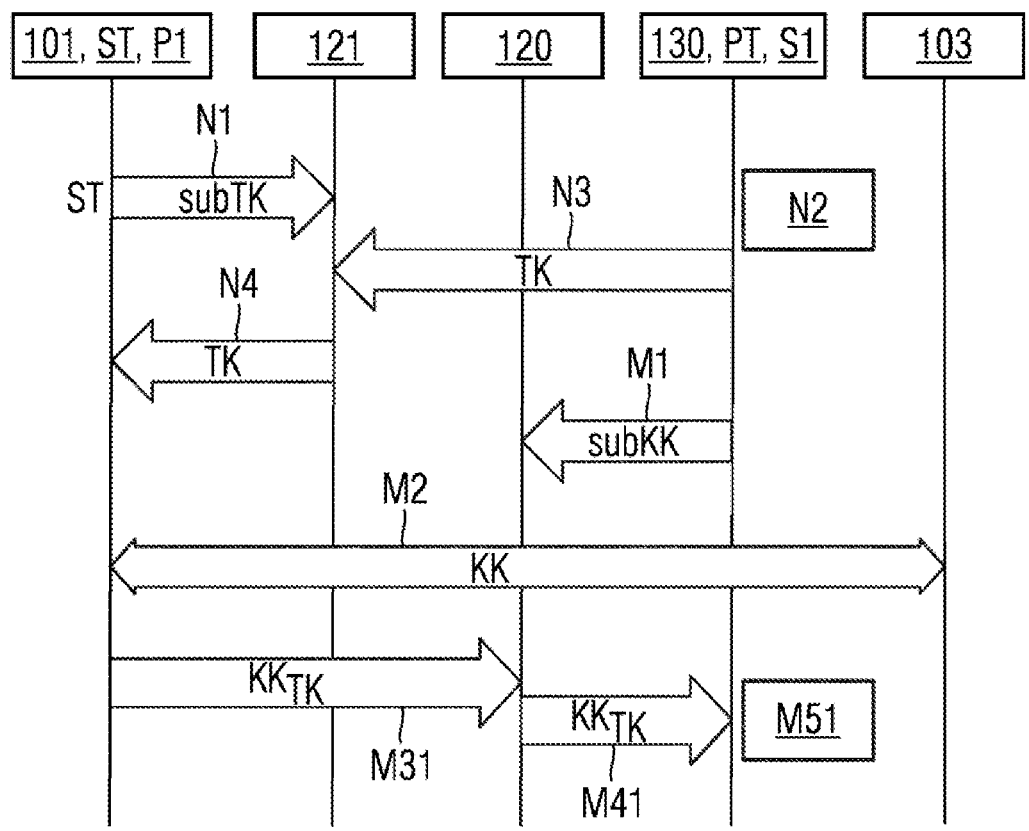
FIG. 5 depicts a second exemplary embodiment of the method for disclosing the transport key in the form of a message flowchart.

As an alternative to a preconfigured transport key TK, the transport key TK, as illustrated in FIG. 5, can likewise now be made available to the first communication subscriber 101 via a publish/subscribe method for a publish/subscribe topic of "transport key" subTK. In this case, the monitoring device 130 is configured as a second publishing unit PT, for example in a second publish/subscribe server 121, or is dynamically registered there (not illustrated). By contrast, communication subscribers 101, 102 and 103 which allow monitoring by the monitoring device 130 are registered as a subscribing unit ST. This is depicted, by way of example, for the first communication subscriber 101 as a second subscribing unit ST as method step N1.

If there is a first or an updated transport key TK in the monitoring unit 130, see N2, the monitoring device 130 as a second publishing unit PT transmits the transport key TK to the second publish/subscribe server 121 in method step N3. If an event which has been stipulated for the second publish/subscribe topic of "transport key" occurs, the second publish/subscribe server 121 forwards the transport key TK to all second subscribing units ST, here the first communication subscriber 101, in step N4. If the first communication subscriber 101 negotiates a cryptographic key KK for a communication connection to the communication subscriber 103, see M2, the first communication subscriber 101 subsequently uses the transport key TK to encrypt the negotiated cryptographic key KK and to transmit the encrypted cryptographic key $KK_{TK}$ as a publishing unit P1 for the topic of "cryptographic key" to the first publish/subscribe server 120, see step M31. The publish/subscribe server 120 forwards the cryptographic key $KK_{TK}$ encrypted using the transport key TK to the monitoring device 130 as a subscribing unit S1, see step M41. The monitoring device 130 can now decrypt the encrypted cryptographic key $KK_{TK}$ using the transport key TK known to it and can use the cryptographic key KK to decrypt the communication connections to be monitored, see step M51. Alternatively, the communication subscriber 101 can also be registered for the publish/subscribe topic of "transport key" after the monitoring device 130 has been registered for the publish/subscribe topic of "cryptographic key" with the publish/subscribe server 120, see method step M1.

The described method for disclosing at least one cryptographic key has the advantage that it can be easily implemented and widespread protocols can be used as publish/subscribe protocols. A multiplicity of communication subscribers can efficiently provide cryptographic keys and their communication connections can be monitored. At the same time, a wide variety of monitoring apparatuses can be efficiently and easily incorporated for the purpose of decrypting and monitoring the transmitted data. Furthermore, as a result of the publish/subscribe server, there is a simple possible way of recording which monitoring units have received which cryptographic keys. Monitoring by monitoring devices which are not themselves inside the communication connection can likewise be carried out.

All of the described and/or depicted features can be advantageously combined with one another within the scope of the present invention. The embodiment of the present invention is not restricted to the exemplary embodiments described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method for disclosing at least one cryptographic key for encrypting at least one communication connection between a first communication subscriber and a second communication subscriber, the method comprising:
   registering at least one of the communication subscribers as a publishing unit with a publish/subscribe server and registering at least one monitoring device as a subscribing unit, and
   when subsequently negotiating a cryptographic key by means of the publishing unit when setting up a communication connection between the first communication subscriber and the second communication subscriber;
   the cryptographic key is automatically made available to the publish/subscribe server by the publishing unit;
   the cryptographic key is transmitted from the publish/subscribe server to the subscribing unit; and
   the at least one communication connection is decrypted by the subscribing unit using the cryptographic key.

2. The method as claimed in claim 1, wherein the negotiated cryptographic key is provided by the publishing unit only for a communication connection which satisfies at least one predefined criterion.

3. The method as claimed in claim 2, wherein the at least one predefined criterion includes an address of a communication partner, a domain name, a system name used for the communication connection, a port number used, or a combination thereof.

4. The method as claimed in claim 1, wherein the negotiated cryptographic key is provided only for a communication connection starting from the publishing unit or arriving at the publishing unit.

5. The method as claimed in claim 1, wherein an integrity key checks the integrity of the communication connection is made available to the publish/subscribe server.

6. The method as claimed in claim 1, wherein the negotiated cryptographic key is immediately transmitted to the subscribing unit after setting up the communication connection.

7. The method as claimed in claim 1, wherein the negotiated cryptographic key is transmitted to the subscribing unit only after expiry of a predefined period after setting up the communication connection.

8. The method as claimed in claim 1, wherein a commitment value of the at least one cryptographic key is provided or transmitted.

9. The method as claimed in claim 1, wherein the cryptographic key is provided in a manner encrypted with a transport key which differs from the cryptographic key.

10. The method as claimed in claim 9, wherein the transport key is a public key of the monitoring unit or a group key.

11. The method as claimed in claim 9, wherein the transport key is transmitted to the communication subscriber as a publishing unit via a publish/subscribe server after the communication subscriber has been registered as a second subscribing unit and at least one monitoring device has been registered as a second publishing unit with the publish/subscribe server for distributing the transport keys.

12. The method as claimed in claim 1, wherein a publish/subscribe protocol, in particular a session initiation protocol SIP, a unified architecture protocol of the OPC foundation OPC UA, an extensible messaging and presence protocol XMPP, an advanced message queuing protocol AMQP or a message queuing telemetry transport protocol MCTT discloses the cryptographic key.

13. A system for disclosing at least one cryptographic key for encrypting at least one communication connection between a first communication subscriber and a second communication subscriber, the system comprising:
   the first communication subscriber, the second communication subscriber, at least one monitoring device, and a publish/subscribe server, wherein:
     the at least one monitoring device is registered as a subscribing unit with the publish/subscribe server to receive a negotiated cryptographic key from the publish/subscribe server and to decrypt the at least one communication connection using the negotiated cryptographic key;
     at least one of the communication subscribers is registered as a publishing unit with the publish/subscribe server;
     to make the negotiated cryptographic key available to the publish/subscribe server during subsequent negotiation of a cryptographic key when setting up a communication connection between the first and second communication subscribers; and
     the publish/subscribe server transmits negotiated cryptographic keys to a monitoring device.

14. The system as claimed in claim 13, wherein the system is designed to carry out a method for disclosing at least one cryptographic key for encrypting the at least one communication connection between the first communication subscriber and the second communication subscriber.

15. The system as claimed in claim 13, wherein the at least one communication subscriber, the monitoring unit and the publish/subscribe server are designed to carry out topic-based publish/subscribe methods.

16. The system as claimed in claim 13, wherein the monitoring device is arranged inside the communication connection.

17. The system as claimed in claim 13, wherein a connection device is arranged inside the communication connection and the monitoring device is in the form of a unit physically separate from the connection device and is connected to the connection device.

18. A computer program product, comprising a computer readable hardware storage device having computer readable program code stored therein, said program code executable by a processor of a computer system to implement the method as claimed in claim 1.

* * * * *